(12) United States Patent
Estefanous et al.

(10) Patent No.: US 9,951,741 B2
(45) Date of Patent: Apr. 24, 2018

(54) PREDICTIVE CORRECTION IN INTERNAL COMBUSTION ENGINES

(71) Applicant: Wayne State University, Detroit, MI (US)

(72) Inventors: Fadi Adly Anis Estefanous, Warren, MI (US); Shenouda Mekhael, Detroit, MI (US); Naeim A. Henein, Grosse Pointe Farms, MI (US)

(73) Assignee: Wayne State University, Detroit, MI (US)

( * ) Notice: Subject to any disclaimer, the term of this patent is extended or adjusted under 35 U.S.C. 154(b) by 0 days.

(21) Appl. No.: 14/774,754

(22) PCT Filed: Mar. 11, 2014

(86) PCT No.: PCT/US2014/023245
§ 371 (c)(1),
(2) Date: Sep. 11, 2015

(87) PCT Pub. No.: WO2014/164698
PCT Pub. Date: Oct. 9, 2014

(65) Prior Publication Data
US 2016/0025060 A1 Jan. 28, 2016

Related U.S. Application Data

(60) Provisional application No. 61/776,421, filed on Mar. 11, 2013.

(51) Int. Cl.
*F02P 5/00* (2006.01)
*F02P 5/145* (2006.01)
(Continued)

(52) U.S. Cl.
CPC .............. *F02P 5/145* (2013.01); *F02D 35/02* (2013.01); *F02D 35/021* (2013.01);
(Continued)

(58) Field of Classification Search
CPC . F02D 37/02; F02P 5/00; F02P 5/1526; F02P 5/145
(Continued)

(56) References Cited

U.S. PATENT DOCUMENTS 4,308,519 A 12/1981 Garcea et al.
4,665,737 A 5/1987 Britsch et al.
(Continued)

FOREIGN PATENT DOCUMENTS

DE 10 2009 008248 A1 8/2010
EP 1 473 452 A2 11/2004
(Continued)

OTHER PUBLICATIONS

European Application No. 14779201.4, Partial Supplementary European Search Report dated Oct. 27, 2016.
(Continued)

*Primary Examiner* — John Kwon
(74) *Attorney, Agent, or Firm* — Brinks Gilson & Lione

(57) ABSTRACT

A method and system for reducing cycle to cycle variation of an engine is provided. The system may determine fuel injection characteristics and predict a gas burning rate or flame speed based on the fuel injection characteristics. The system may adjust an ignition timing in response to the predicted gas burning rate within the same engine cycle.

8 Claims, 11 Drawing Sheets

(51) Int. Cl.
*F02P 5/152* (2006.01)
*F02D 35/02* (2006.01)
*F02M 65/00* (2006.01)
*F02D 41/40* (2006.01)
*F02D 41/14* (2006.01)

(52) U.S. Cl.
CPC ......... *F02D 35/027* (2013.01); *F02D 35/028* (2013.01); *F02M 65/001* (2013.01); *F02M 65/005* (2013.01); *F02P 5/152* (2013.01); *F02D 41/402* (2013.01); *F02D 2041/1412* (2013.01); *F02D 2200/063* (2013.01); *F02M 2200/245* (2013.01); *Y02T 10/46* (2013.01)

(58) Field of Classification Search
USPC ............ 123/406.11, 406.15, 406.23, 406.26, 123/406.47; 701/103–105
See application file for complete search history.

(56) References Cited

U.S. PATENT DOCUMENTS

| | | | |
|---|---|---|---|
| 4,936,275 A | 6/1990 | Takeda | |
| 4,947,680 A | 8/1990 | McDougal | |
| 5,099,681 A | 3/1992 | Dils | |
| 6,550,312 B1 | 4/2003 | Hohner et al. | |
| 6,935,311 B2 | 8/2005 | Visser | |
| 6,947,830 B1* | 9/2005 | Froloff | F02D 35/023 701/111 |
| 6,999,866 B2 | 2/2006 | Noda | |
| 2005/0161018 A1 | 7/2005 | Tomita | |
| 2006/0137648 A1 | 6/2006 | Nakashima et al. | |
| 2009/0084353 A1 | 4/2009 | Inada et al. | |
| 2011/0079194 A1 | 4/2011 | Tanaka | |
| 2011/0241772 A1 | 10/2011 | Wich et al. | |
| 2012/0180756 A1 | 7/2012 | Estefanous | |
| 2012/0271533 A1 | 10/2012 | Shishime | |
| 2016/0377043 A1* | 12/2016 | Wang | G05B 15/02 701/111 |

FOREIGN PATENT DOCUMENTS

| | | |
|---|---|---|
| EP | 1 473 452 A3 | 6/2005 |
| EP | 1 831 522 | 9/2007 |
| EP | 2 369 158 A2 | 9/2011 |
| JP | 5335827 | 4/1978 |
| JP | 6429669 | 1/1989 |
| JP | 2006-183548 A | 7/2006 |
| JP | 2006183548 | 7/2006 |
| WO | WO 99/34103 | 7/1999 |
| WO | WO 2010/106259 A1 | 9/2010 |

OTHER PUBLICATIONS

Extended European Search Report, Application No. 14779201.4-1603, dated Mar. 10, 2017, 14 pages.
International Search Report, International Application No. PCT/US14/23245, dated Oct. 15, 2014.

* cited by examiner

PREDICTIVE CORRECTION IN INTERNAL COMBUSTION ENGINES

RELATED APPLICATIONS

The present patent document claims the benefit of the filing date under 35 U.S.C. § 119(e) of Provisional U.S. Patent Application Ser. No. 61/776,421, filed Mar. 11, 2013, and entitled "Predictive Correction In Internal Combustion Engines" which is hereby incorporated by reference.

BRIEF SUMMARY

A method and system for reducing cycle to cycle variation of an engine is provided. The system may determine fuel injection characteristics and predict a gas burning rate or flame speed based on the fuel injection characteristics. The system may adjust an ignition timing in response to the predicted gas burning rate within the same engine cycle.

DETAILED DESCRIPTION

I. Sensing Operating Parameters

Figure 1:
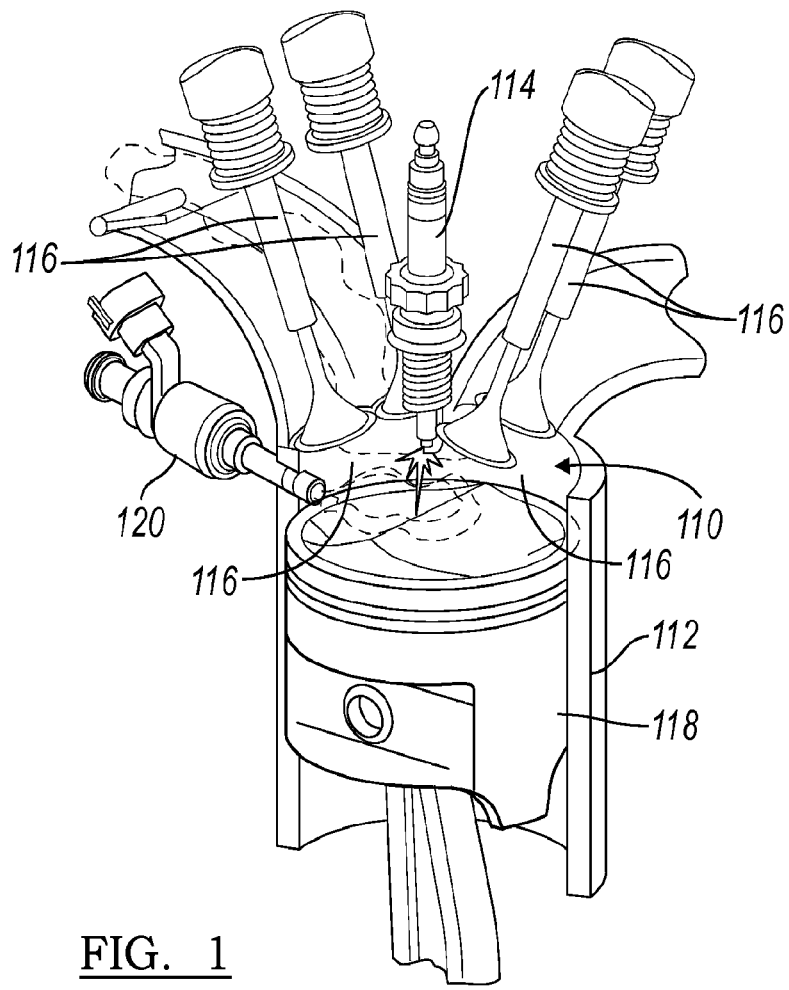
FIG. 1 is a sectional view of a combustion chamber of a Gasoline Direct Injection (GDI)

The disclosure relates to a new technique to correlate the fuel delivery rate to the flame speed or the rate of fuel burning inside the combustion chamber of an internal combustion engine. The fuel delivery rate may be detected by different methods such as a hall-effect sensor, a current probe, a needle lift sensor, or a fuel rate delivery sensor. The flame speed or the rate of fuel burning may be detected by measuring the time required for a flame to propagate inside the combustion chamber over a certain known distance. This distance may be between any two or multiple sensors inserted inside the combustion chamber capable of detecting flame arrival to a specific location. Such sensors include but are not limited to ion current sensors, optical sensors, or any sensor capable of generating an electrical signal when exposed to a flame. The disclosure may also relate to a new technique to monitor the rate of fuel burning or flame speed inside the combustion chamber of an engine to predict abnormal engine operation before its occurrence.

The data in this disclosure was recorded with an implementation of the system disclosed comprising a fuel injector as a hall-effect sensor and a current probe to detect fuel delivery rate. The system further comprised two ion current sensor, a first located on the spark plug, and the second located on the tip of the fuel injector to determine a rate of burning inside the combustion chamber over a known distance. In another implementation for port injection gasoline engines that do not apply fuel injectors inside the combustion chamber, the two ion sensors may comprise a first ionization current sensor located at the spark plug and a second located at known distance inside the combustion chamber. In other arrangements, two or multiple ion sensors may comprise any probes placed at a distance inside the combustion chamber.

Some of the benefits of the systems and methods discussed may comprise predicting and controlling cycle-to-cycle variation enabling reduction in engine idle speed, decreasing in engine vibration, and reducing fuel consumption at various engine loads and speeds. The disclosure may further provide for operating engines efficiently with a variety of fuels and controlling engine operation while shifting between combustion regimes (HCCI, SA-HCCI, stratified charge, conventional gasoline, etc.). Other benefits of the disclosure may further include extending the power limit of an engine by predicting and avoiding random pre-ignition and engine knock.

II. Prediction and Control of Cycle-to-Cycle Variation

Cycle-to-cycle variations in engine operation may cause a variety of problems relating to the operation of an internal combustion engine. One of the most prominent issues is that the engine thermal efficiency is decreased by this variation especially as the load applied to the engine decreases. That is, as the load of an engine decreases, the cycle-to-cycle variations increase. Cycle-to-cycle variations under normal operating conditions may cause variations in peak cylinder pressure from at least 20-40% depending on the load applied to the engine. Limiting the cycle-to-cycle variations may provide for increased fuel economy, especially in city driving and heavy traffic conditions that include substantial vehicle stoppages.

A major issue that limits improvements in fuel economy is that current diagnostic methods do not have the capability of predicting cycle-to-cycle variations under steady state engine operation. Modern engines may use different techniques such as variable timing to improve efficiency, but this process relies on the presumption that the combustion process is steady and repeatable over engine cycles. In this case, spark timing is fixed under the same engine operating conditions. The systems and methods discussed herein provide for a system that is capable of predicting some factors indicative of cycle-to-cycle variations in an engine based on the fuel delivery rate and readjusting controlling parameters such as spark timing within the same cycle. The various implementations of the system may provide for systems and methods to limit cycle to cycle variations in internal combustion engine operation and improve fuel economy.

Referring to FIG. 1, the combustion chamber of a Gasoline Direct Injection (GDI) is shown. The combustion chamber 110 of the cylinder 112 may generally comprise a spark plug 114, four valves 116, a piston 118, and a fuel injector 120.

In this implementation, the combustion chamber 110 may include sensors 116 for measuring the fuel delivery rate and the rate of burning. The sensors may be discrete or combined in one or more other components. In one particular implementation, a fuel injector 120 may be applied as a hall-effect sensor to limit sensory devices in the combustion chamber. This sensor is used to capture the fuel delivery rate inside the combustion chamber. A current probe was also added around the electrical wiring of the fuel injector solenoid.

The fuel delivery rate may be measured by a hall-effect sensor, a needle lift sensor, fuel rate delivery sensor, or a current probe. The hall-effect sensor may determine the rate of fuel delivery to a cylinder from characteristic signals detected by the hall-effect sensor as fuel passes through the fuel injector. The flame speed or rate of burning may be determined from the time taken for the flame to propagate in the combustion chamber over a certain defined distance. The fuel injector in this implementation has been modified from a standard fuel injector to include a multi-sensing circuit including the hall-effect sensor and the ionization current probe. A Multi-sensing fuel injection system capable of similar capability may be found in U.S. patent application Ser. No. 13/386,028, which is incorporated herein by reference in its entirety. In other implementations, the ionization sensors may comprise a variety of sensors placed in various locations. In general, two or more sensors capable of sensing combustion flames that are separated by a known distance may be applied to calculate the combustion rate. Other implementations may comprise two or more ionization current probes, optical sensors, or any other sensors capable of detecting combustion at a consistent proximity to the sensor.

The ionization current sensors may be configured to measure at least the rate of burning measured as a function of the time required for the ionized flames to travel from a first sensor to a second sensor. In the present implementation, the two sensors may be incorporated in the spark plug and the fuel injector nozzle as shown in FIG. 1. Under normal operating conditions, the ignition signal may activate the spark plug causing a sparking arc within the spark plug gap. Upon firing, the spark plug may ignite fuel in the combustion chamber. The ionization sensor incorporated in the spark plug may then sense the combustion. After the combustion flame expands through the combustion chamber, the ionization sensor in the fuel injector may measure the combustion ionization current as the flame approaches the sensor. The time required for the flame to travel from the ionization sensor of the spark plug to the ionization sensor of the fuel injector may be measured to determine the rate of burning in the combustion chamber.

Figure 2:
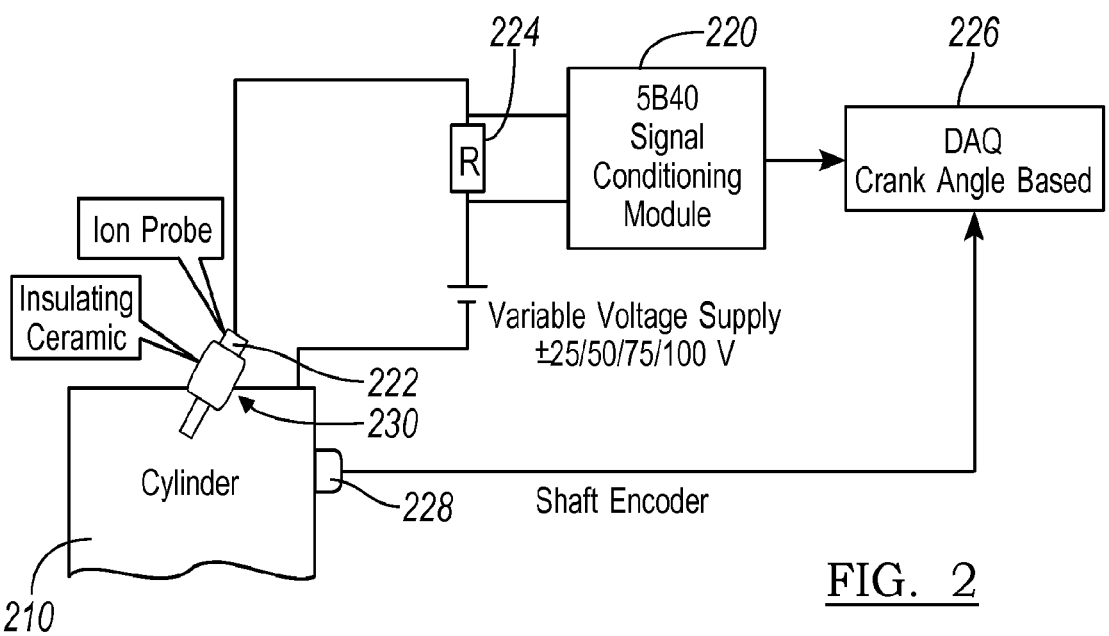
FIG. 2 is schematic view of an ion current probe circuit.

A general circuit schematic for an ionization current probe is shown in FIG. 2. The circuit may function by measuring changes in current that reflect the presence of charged ions, in this case corresponding to the combustion within the cylinder 210. The signal conditioning module 220 may function to filter and process the current signal detected by the ionization probe 222 by detecting the change in voltage across a resistor 224 having a known resistance. The Data Acquisition module 226 may further provide information about the present engine timing based on the crank angle for example measured by a shaft encoder 228 and record the changes in current from the ionization probe 222.

The fuel injector 230 may further comprise a hall-effect sensor. The hall-effect sensor may detect rate of fuel delivery by detecting changes in impedance in the circuit of FIG. 2 when the energizing signal to open the needle of the fuel injector passes through the injector coil. These sensors present one implementation that may serve to measure the signals applied by the disclosure to predict and improve the combustion in a cylinder by reducing inefficient variation and preventing other potentially harmful abnormalities that may occur during engine combustion cycles.

Figure 3:
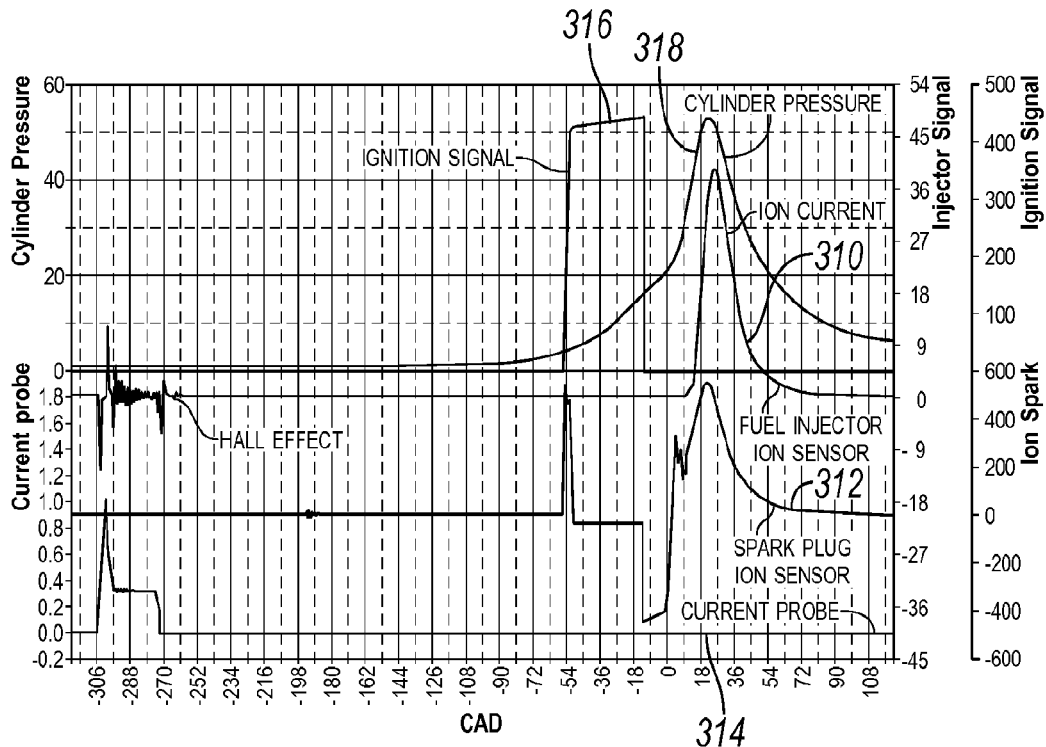
FIG. 3 is a graphical illustration of signals measured during the combustion cycle.

FIG. 3 is a graph demonstrating the signals measured during a normal combustion cycle in a combustion engine. The graph demonstrates the various signals measured by the fuel injector 310 (hall-effect sensor and ionization current sensor), the spark plug ionization current sensor 312, and a current probe 314. These signals are graphed in comparison with the ignition signal 316 and the cylinder pressure 318. These signals may be applied to determine both the fuel delivery rate to the cylinder and the flame speed or rate of fuel burning. From these signals, the fuel delivery rate may be used to predict and control the rate of fuel burning within an engine cycle to limit cycle-to-cycle variations and improve fuel economy. Signals obtained from the ion sensors to monitor flame speed may be used as feedback signals to verify the accuracy of the predictions and refine (self-tuning) the predictive capabilities during engine operation.

As stated previously, in this implementation, the fuel injector may be modified to comprise a hall-effect sensor and an ionization current sensor. On the left side of the graph, the hall-effect sensor incorporated into the fuel injector measures the fuel delivery rate and timing of fuel delivery in the fuel injector. Similarly, the current probe signal shown in FIG. 3 may also be applied to measure the rate of fuel delivery. From rate of fuel delivery, the rate of burning in each combustion cycle of the engine may be predicted with a high level of accuracy.

On the right side of the graph, the ion current is measured by the ionization current sensor of the fuel injector. The graph demonstrates the ionization current measured at the fuel injector increasing with the cylinder pressure. Further, the ionization current sensor on the spark plug also increases with the cylinder pressure and the ionization current measured at the spark plug, but the ion current signal measured at the spark plug precedes the ionization current measured at the fuel injector in time as the flame starts near the spark plug and propagates towards the fuel injector.

Figure 4:
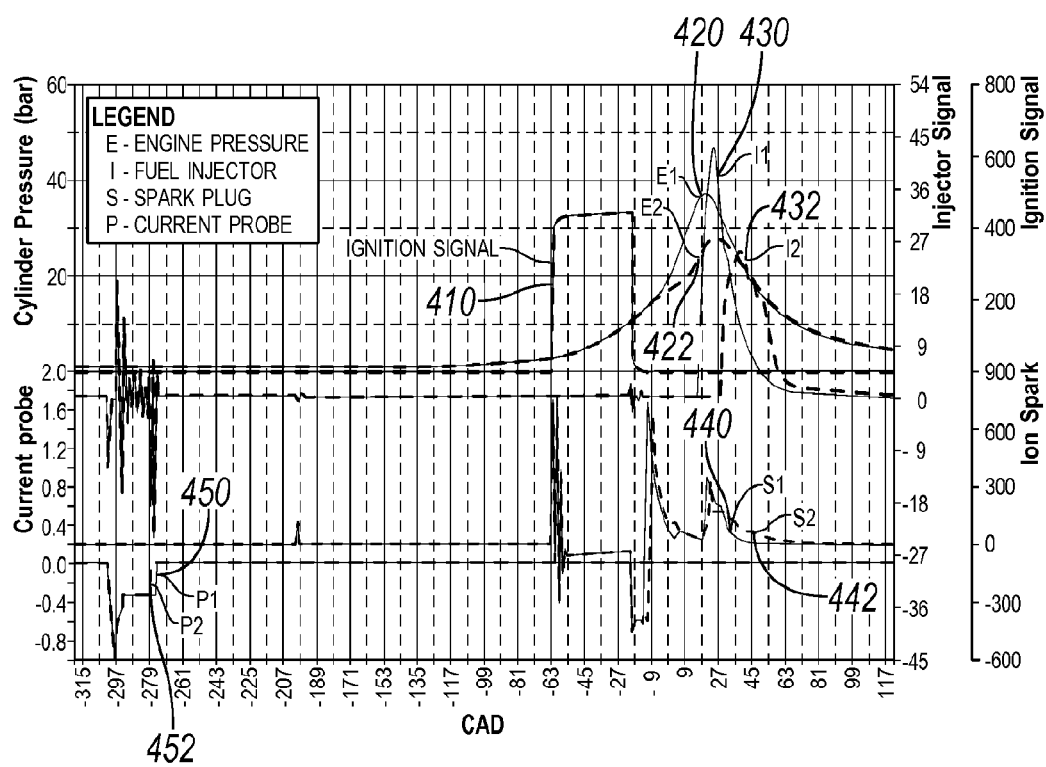
FIG. 4 is a graphical illustration of signals measured during combustion cycle.
Figure 5:
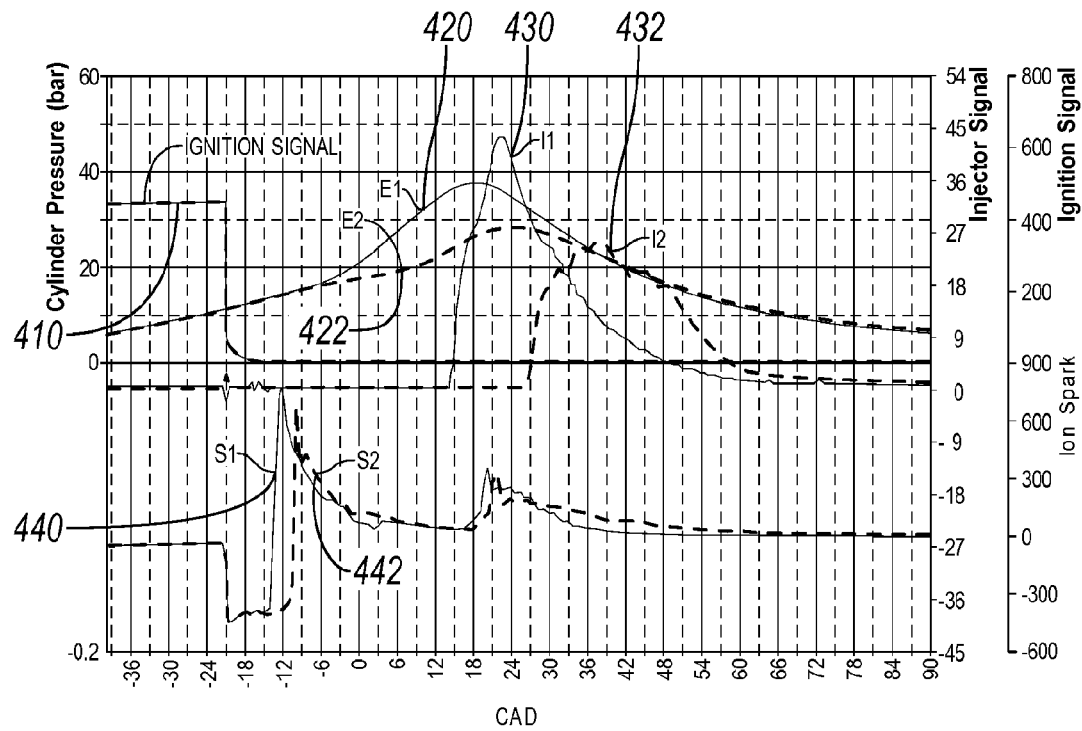
FIG. 5 is a graphical illustration of signals measured during combustion cycle.
Figure 6:
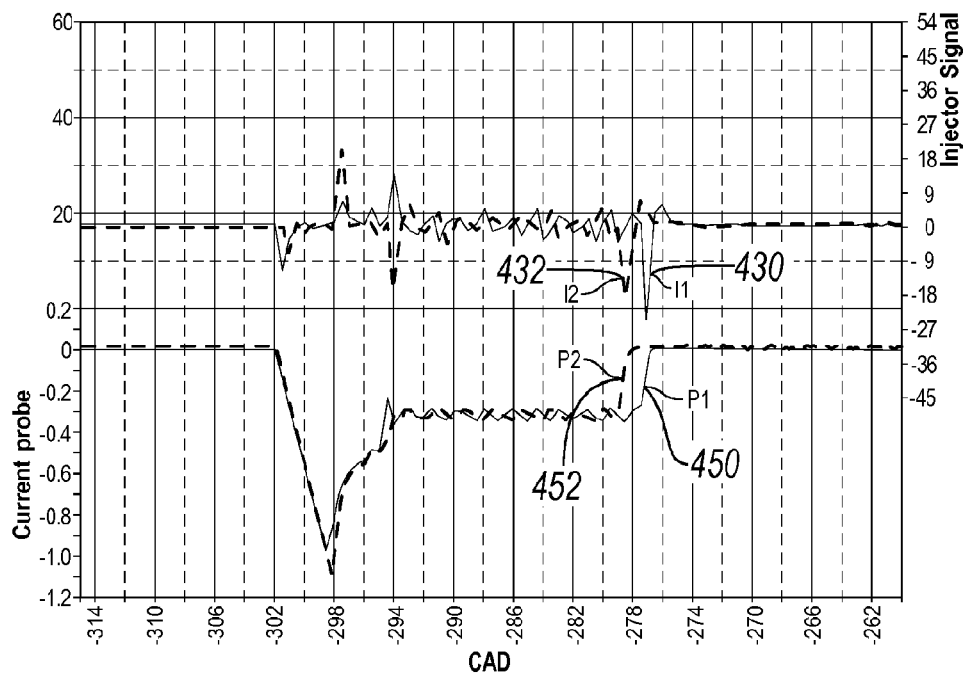
FIG. 6 is a graphical illustration of signals measured during combustion cycle.

Referring now to FIGS. 4 to 6, graphs are shown demonstrating two consecutive engine cycles under the same steady state engine operating conditions that are shown to demonstrate the relationships among the measured signals. Cycle 1 is shown as the solid line and demonstrates a peak cylinder pressure and ionization current that is both greater in amplitude and precedes cycle 2 denoted as the dotted line. The ignition signal is denoted by reference numeral 410. The engine pressure for cycle 1 is denoted by reference numeral 420 and the engine pressure for cycle 2 is denoted by reference numeral 422. The fuel injector for cycle 1 is denoted by reference numeral 430 and the fuel injector for cycle 2 is denoted by reference numeral 432. The spark plug ion signal for cycle 1 is denoted by reference numeral 440 and the spark plug ion signal for cycle 2 is denoted by reference numeral 442. The current probe signal for cycle 1 is denoted by reference numeral 450 and the current probe signal for cycle 2 is denoted by reference numeral 452.

The cycle-to-cycle variation is apparent when comparing the ignition signal to the peak cylinder pressure and ionization current. Though the ignition signal is activated at almost precisely the same time in each cycle, the timing and magnitude of the peak pressure varies substantially. Depending on the engine operating parameters, the cycle-to-cycle variation may be more substantial.

Referring now to FIG. 5, a zoomed in view of FIG. 4 is shown to demonstrate the cycle-to-cycle variations. The second cycle is shown trailing the first cycle for all measurements. This comparison may demonstrate the consistent nature of the relationships among the fuel injector ion probe, the spark plug ion probe, and the measured cylinder pressure.

Referring now to FIG. 6, the predictive value of both the current probe and the fuel injector hall-effect sensor may also be apparent. In the first cycle, both the current probe and the hall-effect sensor begin earlier in time and stabilize later in time than in the second cycle. From this relationship and similar identifying components and characteristics of the current probe and the hall-effect signals in relation to flame speed rate in the cylinder, the burning rate may be predicted and ignition timing adjusted to limit cycle to cycle variation in every engine cylinder independently.

Figure 7:
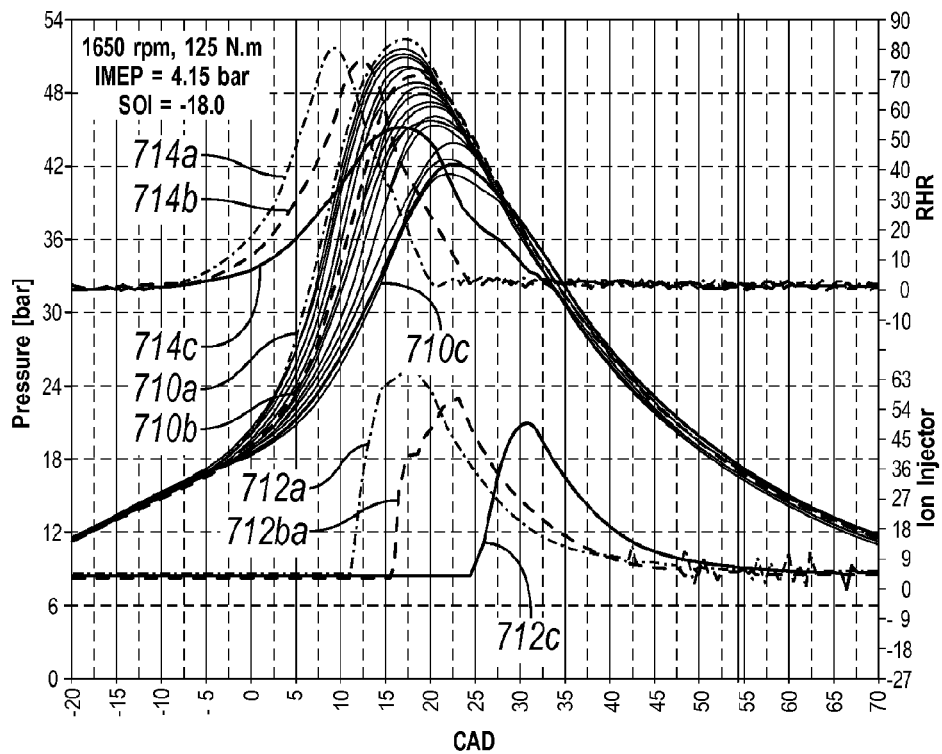
FIG. 7 is a graphical illustration of signals measured during combustion cycle.

As stated previously, the cycle-to-cycle variation may increase as the engine load is reduced. FIG. 7 is a graph demonstrating the cycle-to-cycle variations (a-c) for the injector ion signal 712 and pressure 710 of a cylinder under steady state operation at 1650 RPM at 125 Nm. The rate of heat release (RHR) 714 is also shown. The variations in peak pressure in this case approach 20%. The ion current sensor measurements at the fuel injector demonstrate the relation of the signals to the actual pressure measured in the cylinder. This relationship may later be applied to determine the precise ignition timing in the cylinder.

Figure 8:
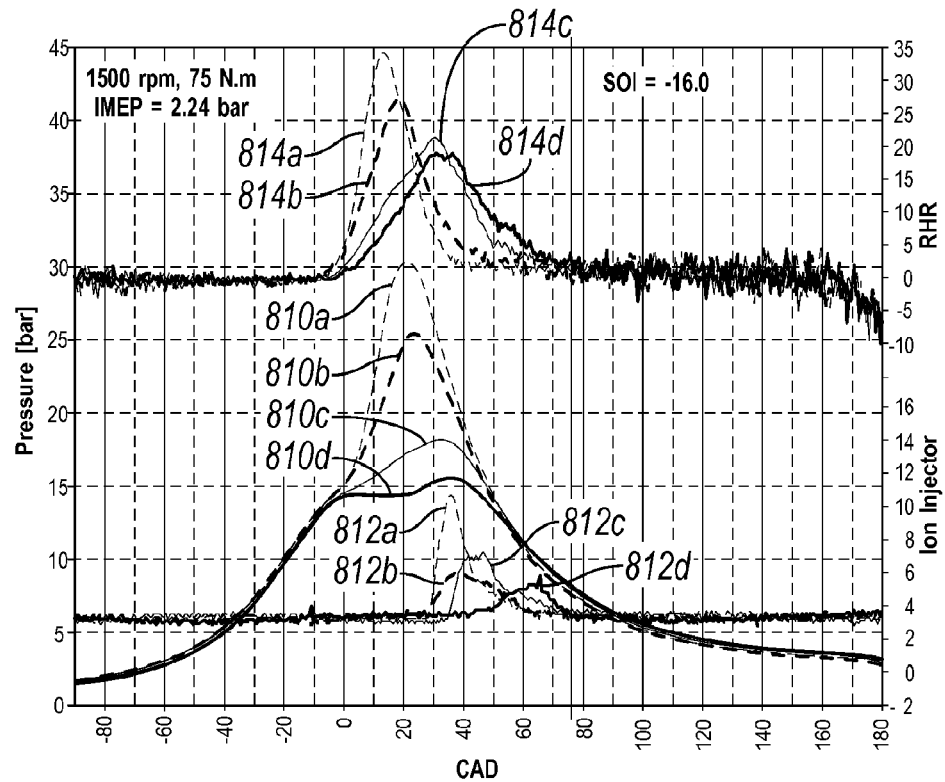
FIG. 8 is a graphical illustration of signals measured during combustion cycle.

FIG. 8 demonstrates the increase in cycle-to-cycle variation (a-d) as the engine load is reduced to 75 Nm at 1500 RPM. The ion current signal 810 obtained by the fuel injector on the side of the combustion chamber is correlated with the pressure 810 variations. From the results the fluctuations in peak pressure are clearly much greater at a reduced load. The cycle-to-cycle variation in peak cylinder pressure under these conditions increased to approximately 50%. The RHR 814 is also shown.

From the results, the benefits of reducing the cycle-to-cycle variation, especially during periods of reduced loading, significantly enhances fuel economy. These results suggest that when a vehicle is idling, its performance may be drastically improved by reducing this variation. By reducing the cycle-to-cycle variation, the peak pressure may also be maintained to maximize engine performance and fuel economy.

Figure 9:
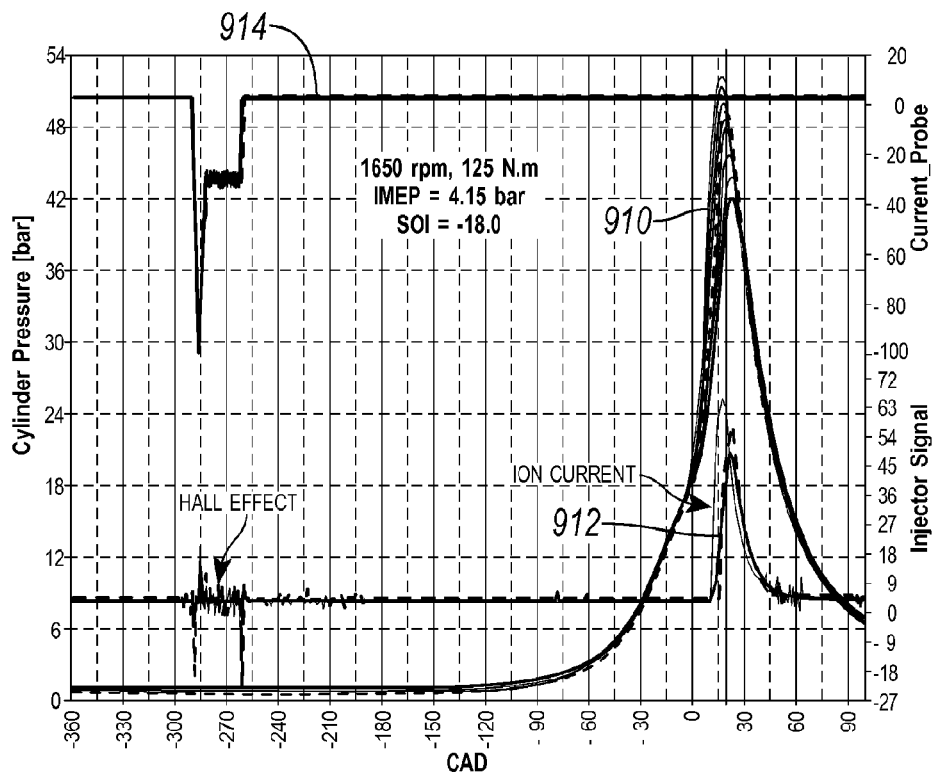
FIG. 9 is a graphical illustration of signals measured during combustion cycle.
Figure 10:
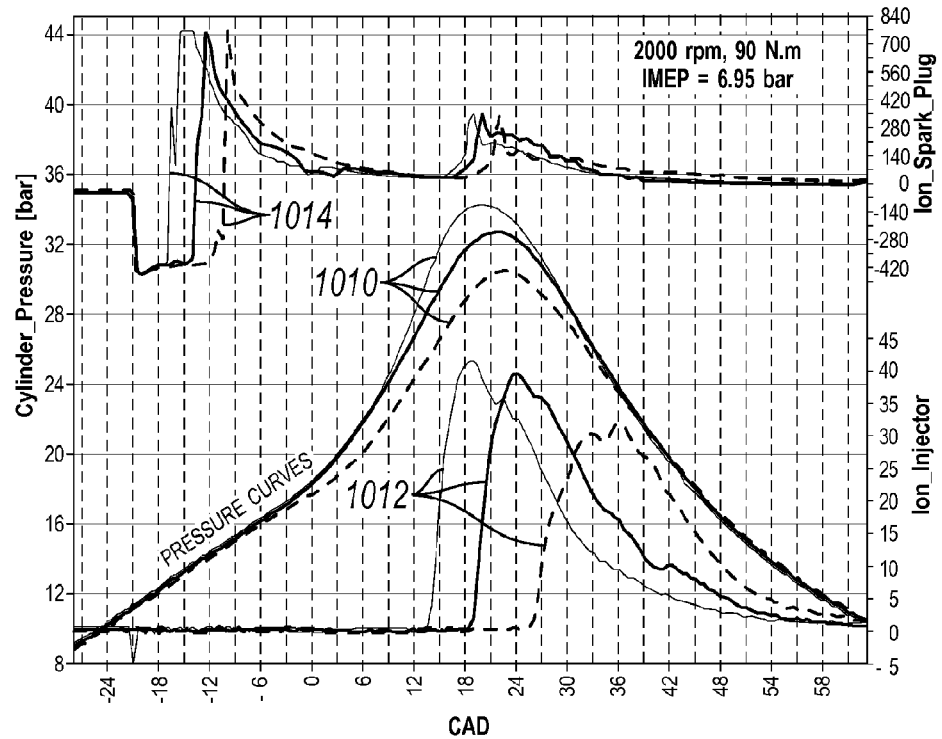
FIG. 10 is a graphical illustration of signals measured during combustion cycle.

Referring to FIGS. 9 and 10, additional sample results are shown for the engine operating at 1650 RPM at 125 Nm and 2000 RPM at 90 Nm respectively. In FIG. 9, the cylinder pressure is illustrated as line group 910. The injector signal is illustrated as line group 912 and the current probe signal is illustrated a line group 914. In FIG. 10, the cylinder pressure is illustrated as line group 1010. The injector signal is illustrated as line group 1012 and the spark plug ion signal is illustrated a line group 1014.

Figure 11:
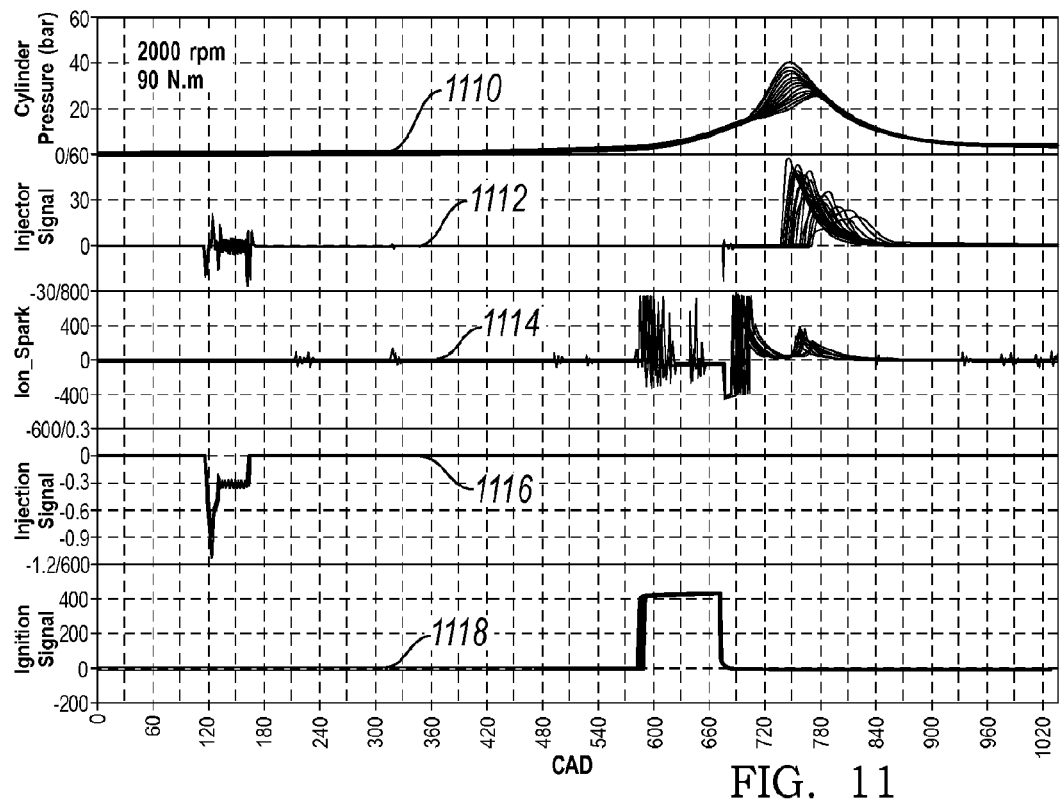
FIG. 11 is a graphical illustration of signals measured during combustion cycle.
Figure 12:
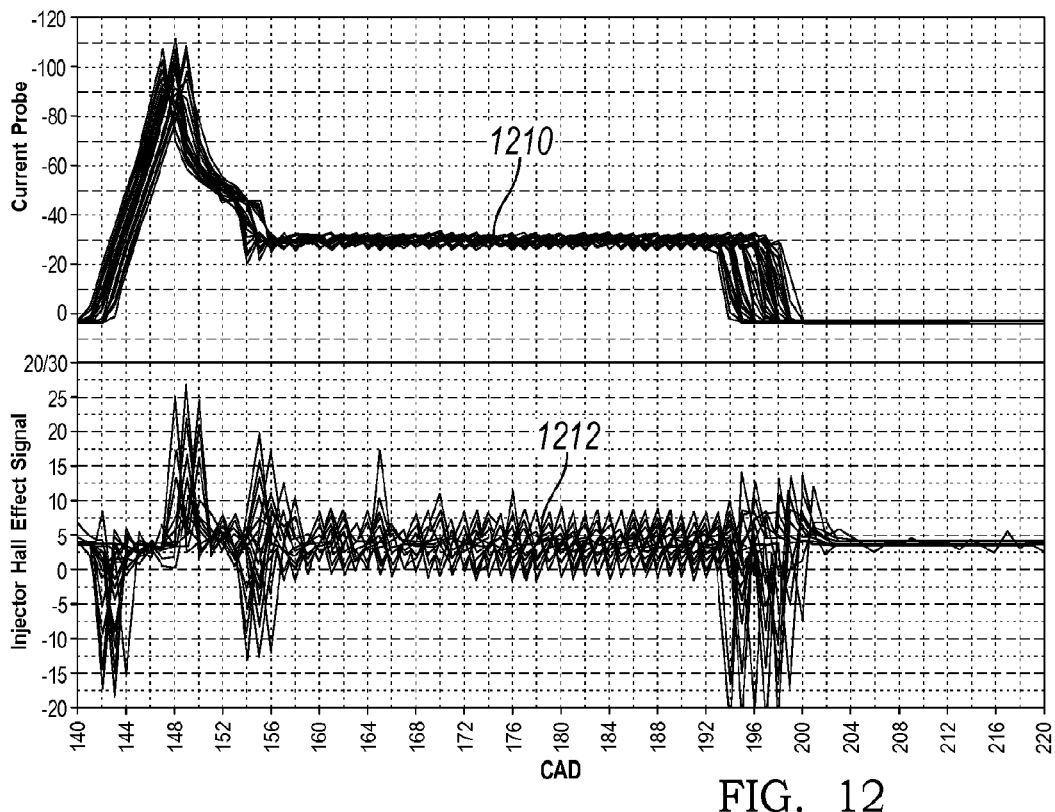
FIG. 12 is a graphical illustration of signals measured during combustion cycle.

Referring to FIGS. 11 and 12 additional sample results including 100 consecutive cycles are shown for the engine operating at 2000 RPM at 90 Nm. In this case, it can be noticed that ignition signal is fairly consistent, however, cycle-to-cycle variations is occurring. In FIG. 11, the cylinder pressure is illustrated as line group 1110. The injector signal is illustrated as line group 1112, spark plug ion signal is illustrate as line group 1114, the injection signal is illustrated as line group 1116 and the ignition signal is illustrated a line group 1118. In FIG. 12, the current probe is illustrated as line group 1210 and the injector hall effect signal is illustrated as line group 1212.

The results shown in FIG. 12 demonstrate the variation in the hall-effect and current sensors over a large number of samples. The variations in the characteristic of these signals serve as predictors of the specific timing of combustion in the cylinder. The cycle-to-cycle variation of the engine may be limited by changing the timing of the ignition signal to limit the variation. Another method may comprise controlling the burn rate.

An algorithm may be developed to use the hall-effect sensor to predict when the flame will arrive at the injector tip and may further predict the flame speed rate in the cylinder. In operation, the system may predict the combustion rate from the hall-effect sensor signal and measure the prediction in a closed feedback loop to ensure that the variation is accurately limited. This method may allow for review of the cycle-to-cycle variation to ensure that it is limited as much as possible. The details of this analysis are now provided in further detail.

Characteristics of the current probe or the hall-effect sensor (hereinafter predictive signals) may be applied to predict the flame speed or rate of burning in each cylinder. In some implementations, a detection of the start and end of the predictive signals may be applied to determine the flame speed or rate of burning. In other cases more advanced algorithms may be applied that measure the slope of the predictive signal curves, the relative timing of the peak measurements and the area under curves. One or more of these characteristics may be measured and calculated to provide one or more coefficients for a polynomial equation. This equation may then be applied to predict the rate of burning in a specific cylinder. The prediction may further correspond to the start of the ion current or the difference between the peaks of two or more ion current sensors which directly relates to the flame speed or burning rate. The prediction may also correspond to the time between the start of the ion current of the first sensor and the start of the ion current signal of the second ion sensor. It could also be the time between 2 peaks, start to peak, end to peak, peak to start, end to start, and any other similar relationships.

Once the rate of burning in the cylinder is determined, the ignition timing for that particular cylinder may be adjusted to limit cycle-to-cycle variation. In order to verify and apply correction and accurate tuning to the burn rate predictions, the ion current sensors may be applied to form a closed feedback loop. The combustion rate of each cycle may be measured from the ion current sensors to determine the specific timing of the combustion in the cylinder. One method may include detecting the peak of the ion current in the spark plug and the peak in the ion current of the fuel injector. Other methods may comprise measuring other identifiable signal characteristics including the beginning or end of ion current signals in each cycle, the area under each of the curves compared over time, or any other identifiable characteristic.

In operation, ideally the timing would not vary due to the correction based on the predictive signals. However, over time, as the engine deteriorates, the signals may need to be adjusted, recalibrated and updated to ensure that cycle-to-cycle variation is limited as much as possible. In this implementation the ion current sensors may detect variation among cycles, and provide for a second algorithm that may be applied to correct for the timing from the predictive signals. One or more of the ionization current signal characteristics may be measured and calculated to provide one or more coefficients for a polynomial equation. This equation may then be applied to measure the actual timing of the flame propagation in a specific cylinder.

Once the predictive signal is calculated and the actual flame propagation timing is measured, the output from both signals may be compared and adjustments may be applied to the algorithm coefficients of the predictive signal. In another implementation a third algorithm may be applied to adjust and update the predicted timing based on the comparison. The method disclosed herein may further include the comparison of the signals described herein to predict the timing of combustion in a cylinder.

In general, the methods disclosed provide for detecting a fuel delivery rate to a cylinder and applying an algorithm to use characteristics of the fuel delivery rate signal to predict the rate of fuel burning, flame speed, or timing of combustion in a cylinder. The timing of the spark ignition or the delivery of the fuel or any other engine controlling parameter may then be adjusted within the same cycle or in a following cycle to limit cycle-to-cycle variations. A characteristic of the fuel burning rate may also be detected or measured from plurality of sources and applied to determine the actual rate of the combustion in the cylinder. The actual rate of combustion may then be compared to verify that the predictions from the fuel delivery rate signal accurately limit cycle to cycle variations.

Figure 13:
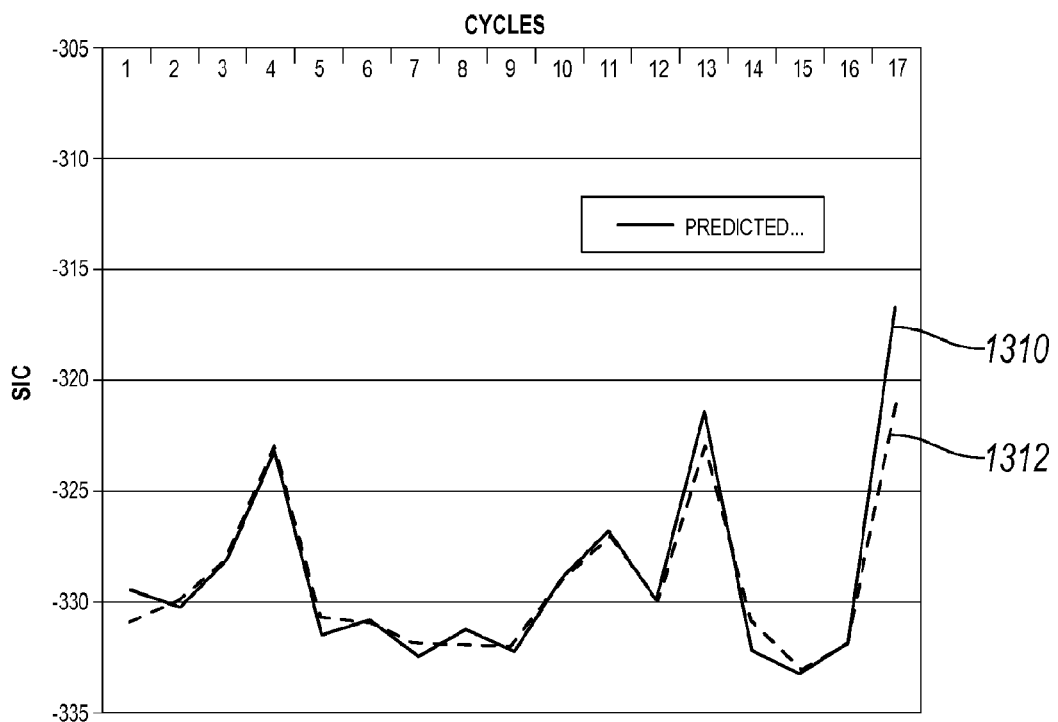
FIG. 13 is a graphical illustration of signals measured during combustion cycle.

Referring now to FIG. 13, a graph is shown demonstrating cycle to cycle variations based on the start of ion current (SIC) near the fuel injector nozzle. The rate of fuel delivery was used to predict the start of ion current at the fuel injector. The graph shows a comparison between both, predictions 1310 and measured values 1312 on a cyclic basis.

From the predicted information, the method may be applied to shift the specific timing of the ignition controller within the same cycle. By adjusting the spark ignition timing to compensate for the predicted variation, the system may substantially reduce cycle-to-cycle variation and minimize the fluctuations shown in FIG. 13.

To allow for an adaptable system, the algorithm applied to predict the combustion timing may also be adjusted based on the particular engine, fuel types and operating conditions. These setting may be initially calibrated through a diagnostic system that may be integrated in the vehicle or as a service provided at automotive service centers. This implementation may further enable the system to be verified throughout operation and tailored to any combustion engine.

III. Prediction and Control of Engine Knock

Another implementation related to the system discussed in Section I may provide for a system capable of predicting engine knock. Engine knock is generally caused when a spark takes place, flame starts propagation, and end-gases auto-ignite before being reached by the flame front. This may lead to pre-ignition and engine wear and damage. Current technology may provide for knock sensors that are capable of detecting engine knock, but current systems do not provide engine control systems that may predict knock in earlier cycles and prevent knock from occurring. By implementing the ion current sensors described in Section II, the disclosure provides for a method and system capable of predicting knock in a previous cylinder combustion cycle and preventing its occurrence in a current cylinder combustion cycle for a particular cylinder.

Figure 14:
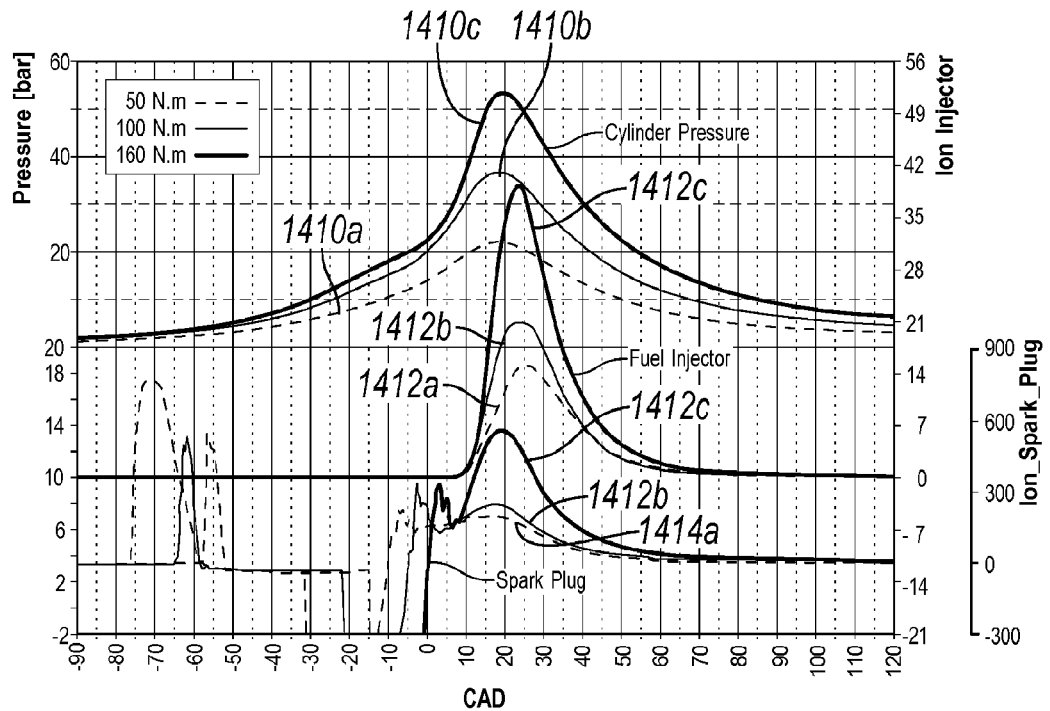
FIG. 14 is a graphical illustration of signals measured during normal combustion cycle.

Referring to FIG. 14, the signals measured for three ignition cycles are shown. The cylinder pressure is illustrated by reference numeral 1410a-c, the fuel injection ion signal is illustrated by reference numeral 1412a-c, and the spark plug ion signal is illustrated by reference numeral 1414a-c. Similar to Section II, the measurements for two ion current sensor, a first located at the spark plug and a second located at the fuel injector are shown, as well as a cylinder pressure. The three cycles are for three different engine loads, 50 Nm (a), 100 Nm (b), and 150 Nm (c). Under normal operation the first peak and the second peak of the spark plug ion current sensor precede the peak of the fuel injector ion current sensor. Also, as the pressure increases, the peaks of the spark plug ion current signal move closer to the peak of the fuel injector ion current signal. As these peaks move closer together, the likelihood of engine knock occurring increases. As such, the knock prediction may be calculated based on the distance between the peaks.

Figure 15:
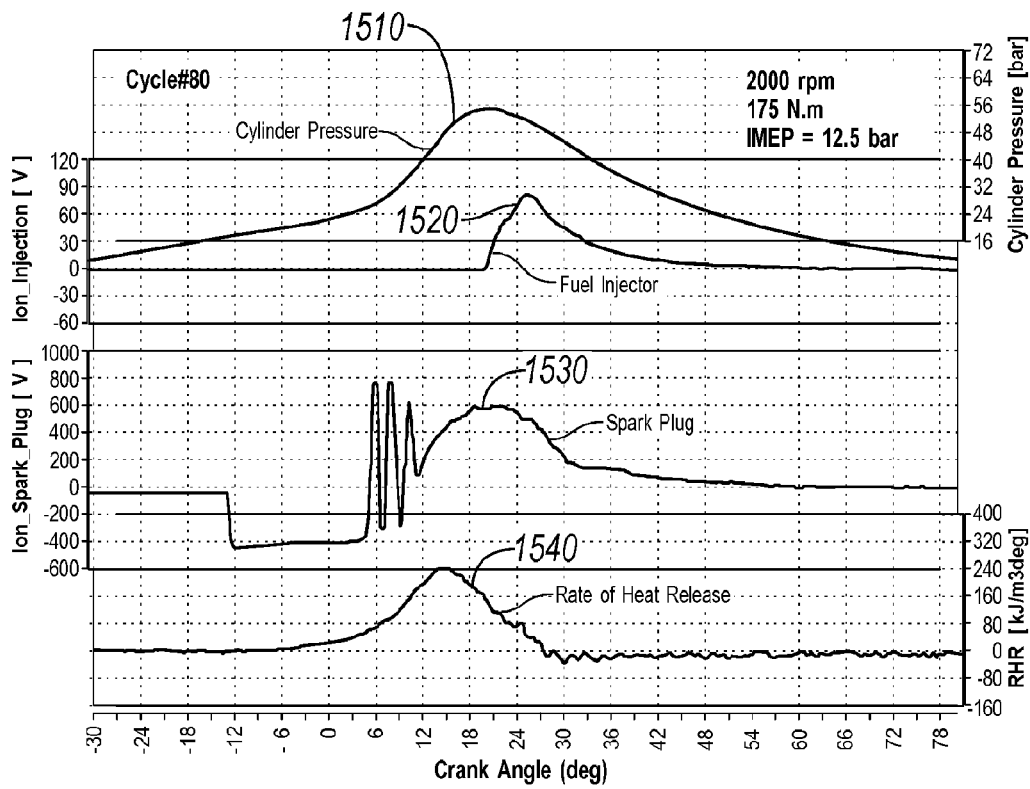
FIG. 15 is a graphical illustration of 1 of 3 sequential combustion cycles, during normal operation.
Figure 16:
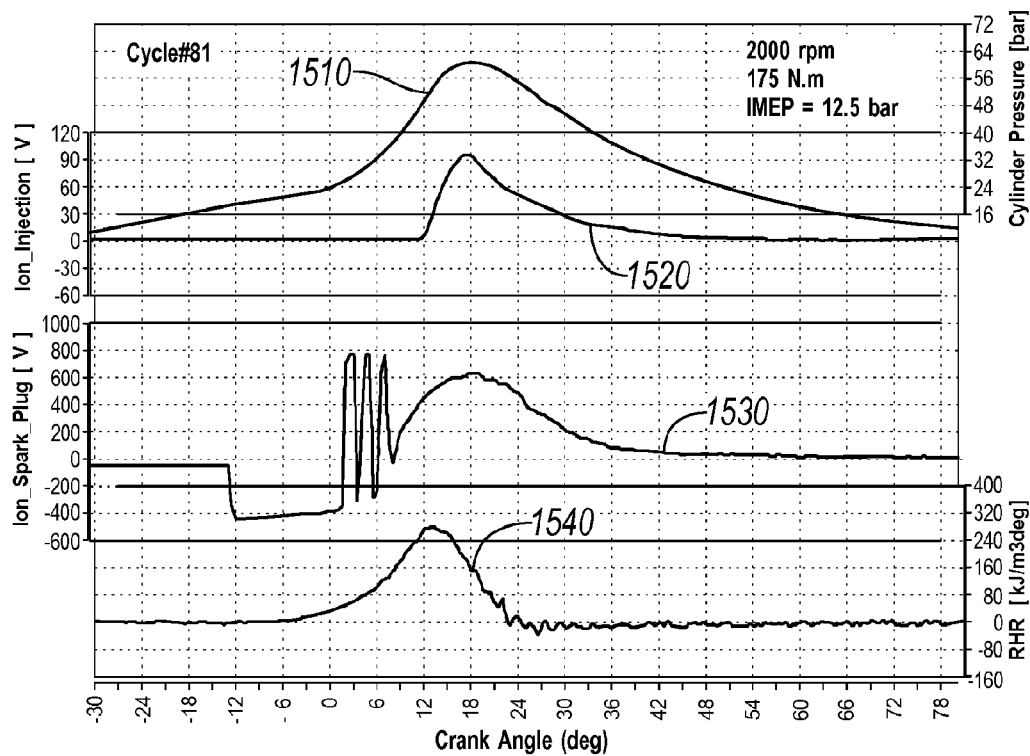
FIG. 16 is a graphical illustration of 2 of 3 sequential combustion cycles, approaching knock.
Figure 17:
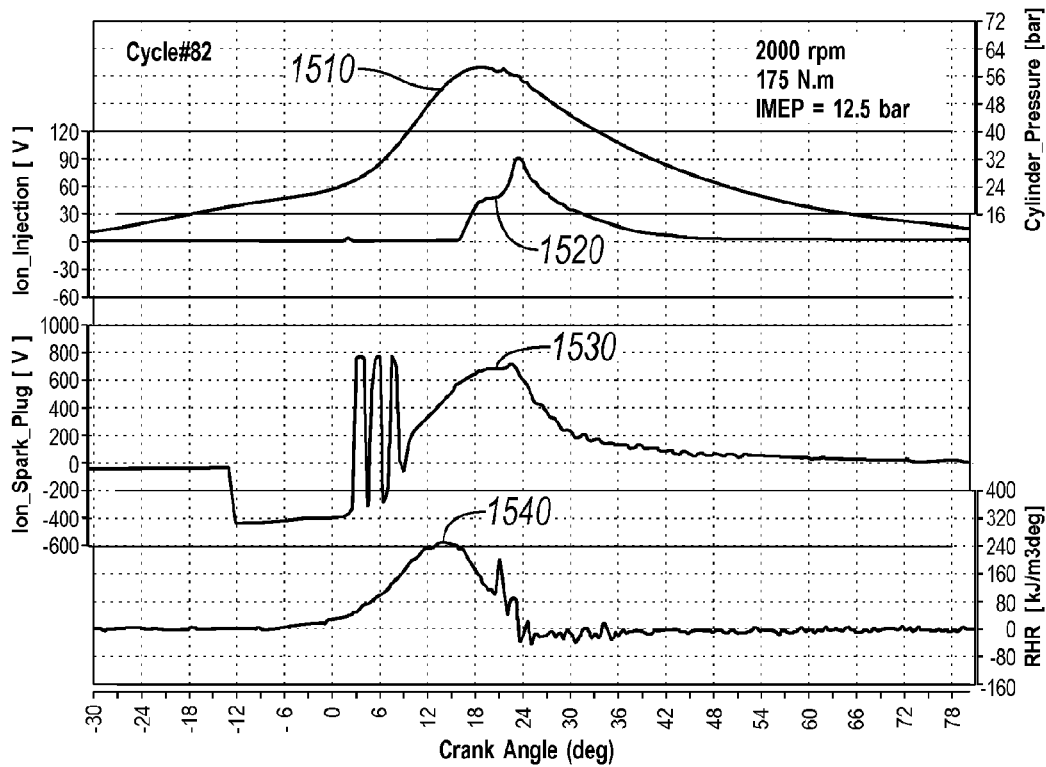
FIG. 17 is a graphical illustration of 3 of 3 sequential combustion cycles, where knock occurs.

Referring now to FIGS. 15 to 17, a series of ion current graphs are shown for three consecutive cylinder combustion cycles (cycles 80-82 respectively). The figures depict four signals: the cylinder pressure 1510, the ion current sensor signal 1520 of the fuel injector, the ion current sensor signal 1530 of the spark plug, and RHR 1540 calculated from the pressure trace.

Transitioning from cycle 80 to cycle 81, it may be noticed that the second peak of the spark plug ion current signal shifts from occurring before the injector ion current signal peak to after the fuel injector ion current signal peak. The slope of the injector ion current sensor also may increase under these conditions. Under these conditions or similar the engine control unit may acknowledge the conditions and take preventative action in the control of the specific cylinder.

Now transitioning from cycles 81 to 82, a knock has been registered due to a lack of preventative action in the cylinder being monitored. The double peak and high rate of ion current rise of the ion current signal of fuel injector and the increased variation in the RHR signal demonstrate that a knock has occurred. The knock in this case is not severe as it will be shown in later graphs; however, the system was able to predict a future engine knock.

In general, a very significant trend is demonstrated when the peak of fuel injector ion current signal is earlier than the second peak of the spark plug. This is an indication that knock has started to occur. The increase in oscillations in the injector ion current sensor may reflect the severity of the knock. The injector ion current signal is generally more sensitive than that obtained from the spark plug as the start of engine knock is usually closer to the side of the combustion chamber rather than in the center. By monitoring both the fuel injector and the spark plug ionization current signals, knock may be avoided.

By monitoring the flame speed rate, the prediction of a knock occurring during a following cycle allows for the engine controller to adjust the controlling parameters of the specific cylinder to prevent the knock from occurring. Some solutions that may prevent damaging knock from occurring include: retarding the ignition signal and consequently, the spark in the combustion chamber, releasing one or more cylinder valves earlier, and multiple injection (e.g. dividing the fuel injection into two or more intervals). Many other solutions may be available within the spirit of the disclosure. The predictive response disclosed herein providing for the avoidance of engine knock may be of primary concern with a variety of solutions to prevent knock.

Figure 18:
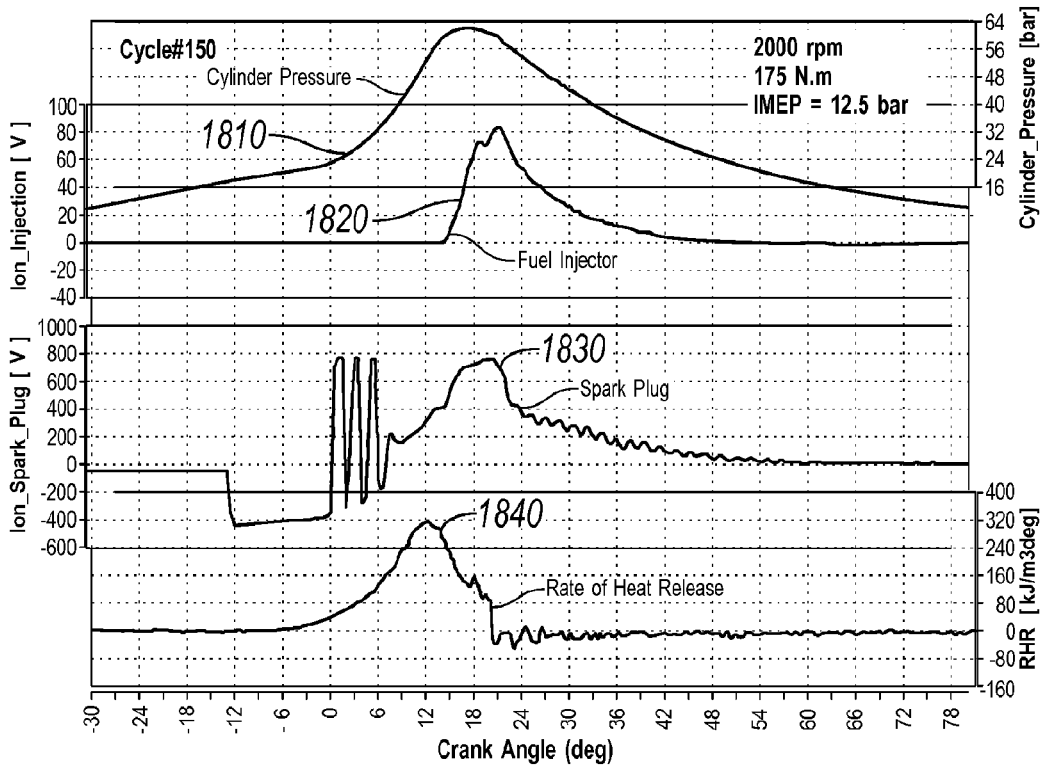
FIG. 18 is a graphical illustration of 1 of 2 sequential combustion cycles, approaching knock.
Figure 19:
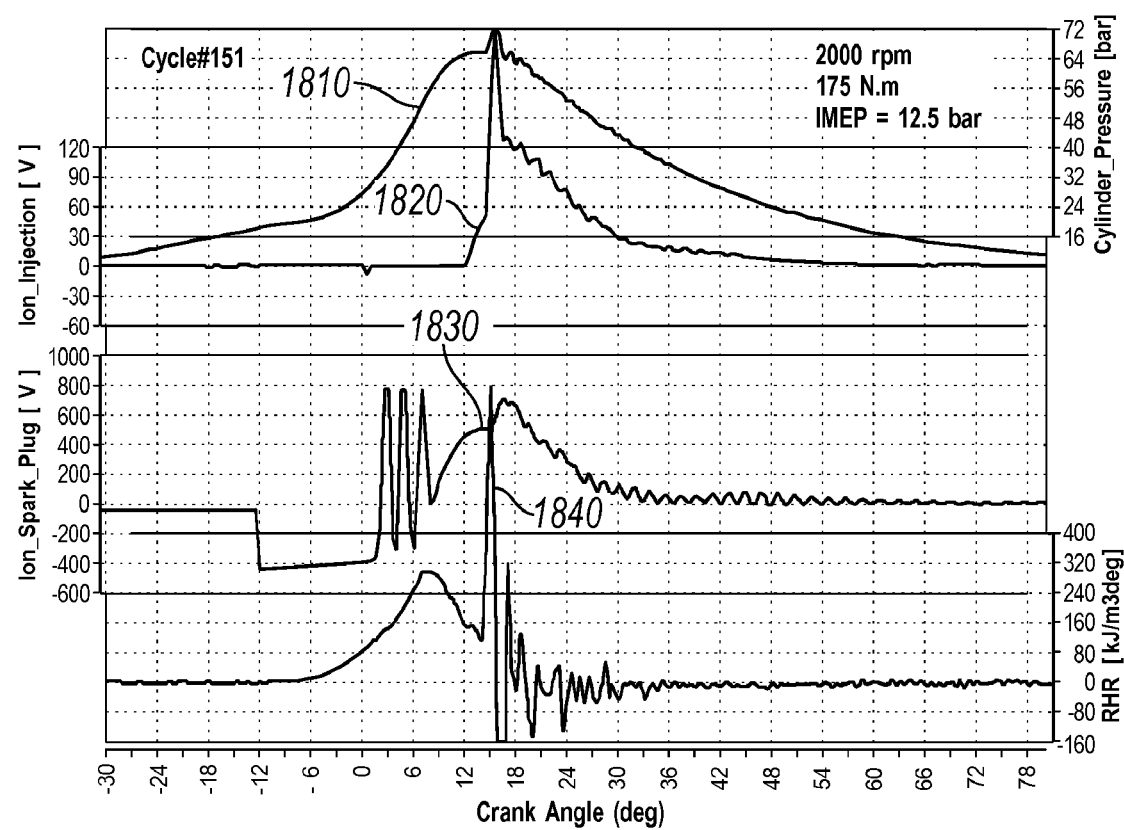
FIG. 19 is a graphical illustration of 2 of 2 sequential combustion cycles, where knock occurs.

Referring now to FIGS. 18 and 19, an example of a prediction of a more severe case of engine knock is shown in two consecutive cylinder cycles (cycles 150 and 151 respectively). The figures depict four signals: the cylinder pressure 1810, the fuel injector signal 1820 of the fuel injector, the ion current sensor signal 1830 of the spark plug, and RHR 1840 calculated from the pressure trace.

Figure 20:
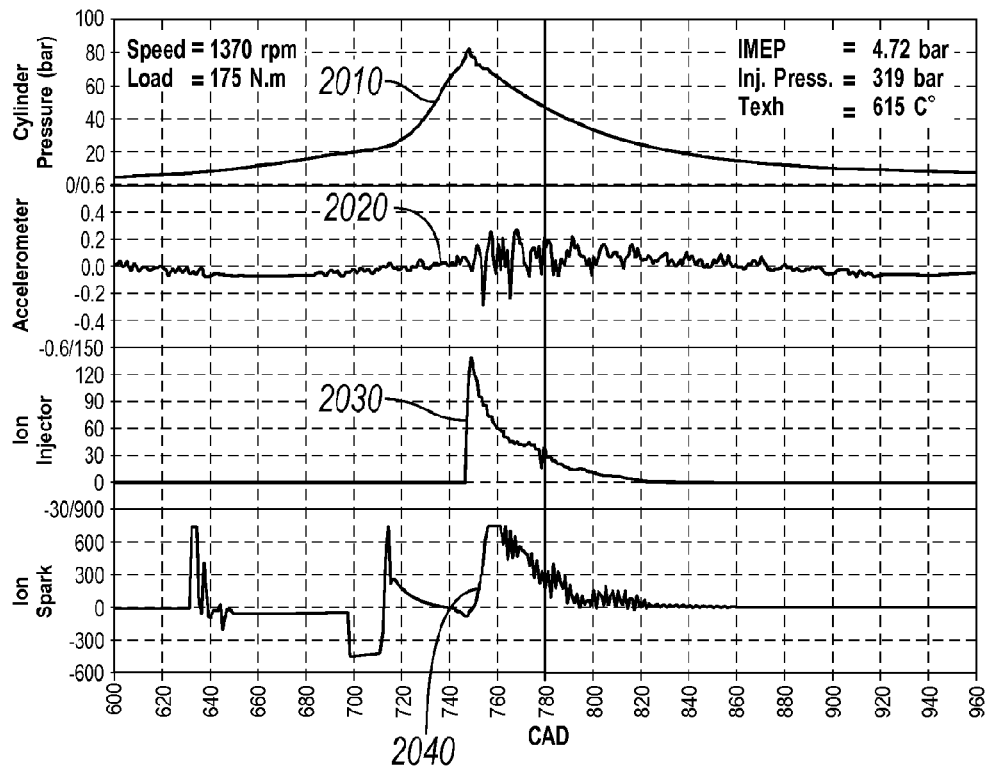
FIG. 20 is a graphical illustration of 1 of 2 sequential combustion cycles, approaching knock.
Figure 21:
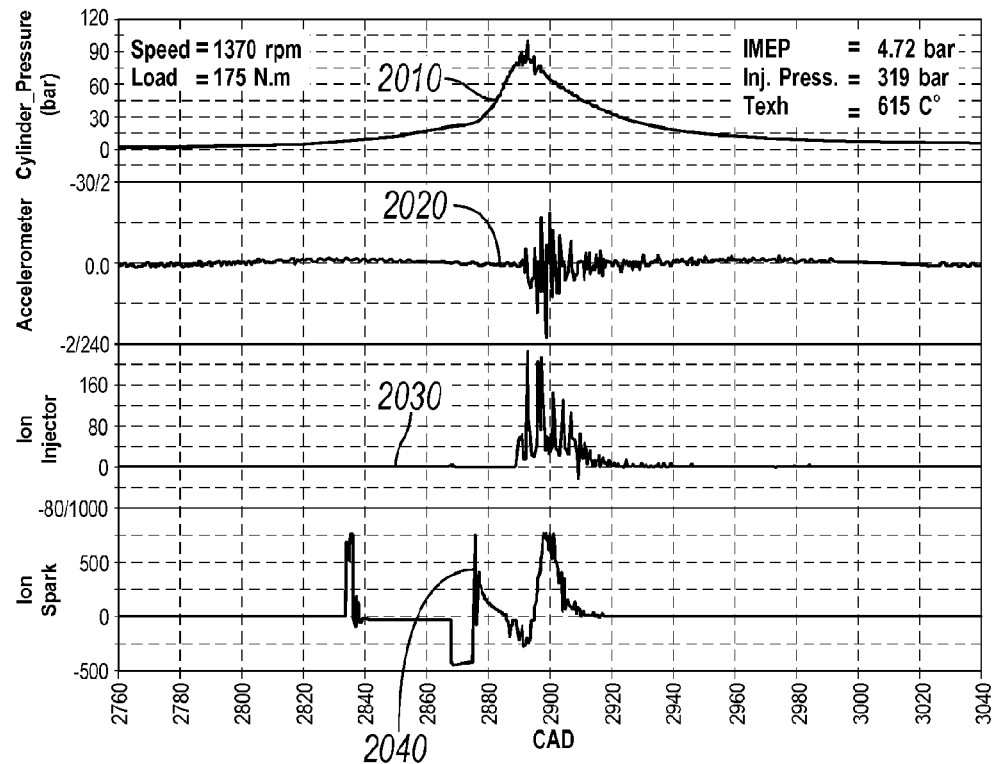
FIG. 21 is a graphical illustration of 2 of 2 sequential combustion cycles, where knock occurs.

Referring now to FIGS. 20 and 21, another example of a prediction of knock is shown in two consecutive cylinder cycles. The figures depict four signals: the cylinder pressure 2010, an accelerometer 2020 to detect knocking, the fuel injector ion signal 2030 of the fuel injector, and the ion current sensor signal 2040 of the spark plug.

Once knock begins it can lead to more serious issues. In many cases it can continue due to further abnormal combustion characteristics. Though knock may not cause considerable damage to an engine over short durations, knock may lead to pre-ignition. Pre-ignition may be particularly harmful to engines. Knock and pre-ignition are caused by separate phenomena during combustion, but they both lead to increased combustion chamber temperatures which may also be a contributing factor to their occurrence. This means that the occurrence of either abnormality may further increase the likelihood of the other occurring. The predictive capability of the systems and methods disclosed herein may provide for the prevention of combustion abnormalities, but it may also provide for improved performance by improving the peak output of engines. As will be discussed further in Section IV, the systems and methods described herein may further provide for the prediction and correction of pre-ignition before it occurs.

Maintaining peak pressure location and magnitude may further provide for engines to safely operate at higher loads. Operating at higher loads may be particularly beneficial in engines that operate under increased pressure and loading conditions (e.g. turbo-charged engines). As demonstrated in FIG. 14, increases in pressure may be directly linked to the same behavioral trends demonstrated in FIGS. 15 to 21. As the pressure or load applied on an engine increases, the second peak of the ionization current signal of the spark plug draws closer to the peak of the fuel injector ionization current signal. This behavior may also lead to knock in turbo charged engines and any other engines types operating at higher pressure and/or loading requirements.

By identifying the characteristics of knock prior to its occurrence, the system and methods disclosed herein may provide for advanced engine control systems that may adjust ignition timing, valve release, fuel injection strategy, and other engine control parameters and combinations thereof to prevent knock. The methods of control applied herein may further provide for increased efficiency and prevention of combustion abnormalities that currently limit the performance capacity of engines. The methods and systems disclosed herein may provide for the prediction and correction of the knock before it begins and consequently may further provide for increased performance and loading potential allowing for greater levels of efficiency and performance.

IV. Prediction and Control of Pre-Ignition and Random Pre-Ignition

Similar systems and methods as those described in Section III may further provide for the prediction of pre-ignition in internal combustion engines. As noted in Section II, engine knock and pre-ignition are caused by different phenomena, and as such, they may require different predictive approaches. Preignition may be caused by severe knocking conditions. On the other hand, random pre-ignition causes are not known and it occurs unexpectedly while an engine is operating smoothly and steadily. The occurrence of pre-ignition may be predicted and prevented through the various implementations of the methods and systems disclosed herein for detecting the rate of burning in a combustion chamber.

As engine load increases the distance between the ion current peaks obtained by the spark plug and the fuel injector ionization current sensors is reduced. In pre-ignition, the ion current signal obtained by the fuel injector may happen much earlier than that of the spark plug (before the very first spark energizing peak correlated to the ignition signal). Fluctuations in ion current signal of the spark plug may also occur before the ignition signal in case preignition starts closer to the spark plug ion sensor. In addition, abnormalities in the characteristics of the ion current signals in cycles preceding the preignition cycle may be used to predict the occurance of pre-ignition. Once predicted, pre-ignition may be avoided in a specific cylinder by adjusting engine controling parameters.

A prediction of pre-ignition may be associated with the fuel injector ionization current fluctuating prior to the spark timing in which a flame originating from the spark plug, located at the center of the cylinder, and could reach the outer wall of the cylinder where the fuel injector is located. Similar behavior may also be monitored by optical sensors, ionization current sensors, or other sensors capable of detecting ignition. In another implementation a single ionization current sensor capable of detecting combustion activity away from the spark plug may be compared to the ignition signal to monitor early combustion, or pre-ignition related conditions.

Prediction of pre-ignition by the systems and methods disclosed may comprise the detection of abnormalities, detected by the fuel injection ion current sensor or the spark plug ion current sensor or any other flame detector located inside the combustion chamber. The activity that may be detected may generally be described as a measured ion current preceding the activity of a normal combustion cycle as shown in FIG. 15. Referring to FIG. 15, it may be apparent that in a normal combustion cycle, prior to the ignition signal and the first peak of the spark plug ionization current signal, there is no activity detected in the fuel injection ionization current sensor. However, in case of pre-ignition, there may be a noticeable activity prior to at least the ignition timing of the spark plug. The activity may not be of the severity, slope, or precise timing of that shown for the fuel injection ionization current sensor, but it is believed that some measurable phenomena will occur in a cycle prior to an otherwise random pre-ignition signal that may be detected. Once this predictive behavior is detected, it may be prevented by adjusting one of a plurality of engine operating parameters.

In another implementation, the fuel injection characteristics discussed in Section II may also be applied in the prediction of pre-ignition in a current or subsequent combustion cycle. A hall-effect sensor, current probe, needle lift sensor, or any other fuel rate delivery sensor may be applied to determine the fuel injection characteristics of a cylinder. The fuel injection characteristics of one or more combustion cycles may be applied to predict characteristics of the burning rate in the cylinder. These factors and the others described in this disclosure may be applied as coefficients in a predictive algorithm consisting of one or more polynomial equations to predict and/or be considered in the adjustment of one of a plurality of engine operating parameters.

The disclosed methods and systems provide for the capability to detect and predict the future occurrence of the pre-ignition related behavior previously discussed. It will be considered obvious to those skilled in the art that many other similar signal abnormalities measured by a variety of sensors capable of monitoring the presence of combustion or increased heat within a combustion chamber may similarly be applied to equivalently practice the systems and methods disclosed. In one implementation, abnormalities in a combustion cycle may be detected by the spark plug ionization current sensor, or both the fuel injector ionization current sensor and the spark plug current ionization signal. In other implementations a predictive signal may be identified by other sensors including but not limited to optical sensors.

By identifying the characteristics of pre-ignition prior to its occurrence, the system and methods disclosed herein may provide for advanced engine control systems that may adjust ignition timing, valve release, fuel injection properties, cylinder pressure, and other operating parameters and combinations thereof to prevent pre-ignition. The methods of control applied herein may further provide for increased efficiency and prevention of combustion abnormalities that currently limit the performance capacity of engines. The methods and systems disclosed herein may provide for the prediction and correction of pre-ignition before it occurs and consequently may further provide for increased performance and loading potential allowing for greater levels of efficiency and performance.

V. Conclusion

The predictive methods and systems disclosed may also be predicted and controlled by various combinations of sensors that may be located in different locations and may also comprise other devices capable of monitoring combustion, flow rate, current variations and any other diagnostic signals discussed, or similar to those discussed herein, without departing from the spirit of the disclosure. The methods and systems disclosed may provide for the prediction and correction of cycle-to-cycle variation, knock, pre-ignition, and any other related or combined internal combustion characteristic.

Any of the sensors or probes described herein may be connected to circuitry or a processor for evaluation and further processing. In some embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

The methods and systems described herein may be implemented in other forms without departing from its spirit or characteristics. The described implementations are to be considered in all respects only as illustrative and not restrictive. All changes which come within the meaning and range of equivalency of this disclosure are to be embraced within their scope.

The invention claimed is:

1. A method for reducing cycle to cycle variation of an engine, the method comprising:
   determining fuel injection characteristics;
   predicting a gas burning rate or flame speed based on the fuel injection characteristics; and
   adjusting an ignition timing in response to the predicted gas burning rate within a same engine cycle, wherein the gas burning rate or flame speed is determined by predicting flame arrival at one or multiple locations inside a combustion chamber through a first ion current signal timing and a second ion current signal timing.

2. The method according to claim 1, wherein the fuel injection characteristics are determined by at least a hall effect signal, current probe signal, needle lift sensor signal, or fuel rate delivery sensor signal.

3. The method according to claim 1, wherein the fuel injection characteristics include at least one or a combination of an amplitude, length, slope, timing, peak, and/or profile.

4. The method according to claim 1, wherein the gas burning rate is determined by comparing a timing of at least one of a start, end, peak, or centroid of the first ion current signal to a timing for at least one of a start, end, peak, or centroid of the second ion current signal.

5. A method for reducing cycle to cycle variation of an engine, the method comprising:
   determining fuel injection characteristics;
   predicting a gas burning rate or flame speed based on the fuel injection characteristics; and
   adjusting an ignition timing in response to the predicted gas burning rate within a same engine cycle, wherein the gas burning rate or flame speed is determined by predicting flame arrival at one or multiple locations inside a combustion chamber through a first optical sensor timing signal and a second optical sensor signal timing.

6. The method according to claim 5, wherein the fuel injection characteristics are determined by at least a hall effect signal, current probe signal, needle lift sensor signal, or fuel rate delivery sensor signal.

7. The method according to claim 5, wherein the fuel injection characteristics include at least one or a combination of an amplitude, length, slope, timing, peak, and/or profile.

8. The method according to claim 5, wherein the gas burning rate is determined by comparing a timing of at least one of a start, end, peak, or centroid of the first ion current signal to a timing for at least one of a start, end, peak, or centroid of the second ion current signal.

* * * * *